Sept. 27, 1955  J. P. GLASS, JR  2,718,702
MECHANISM FOR SIMULTANEOUSLY PRESENTING A PATTERN
TO A TRACER AND A PIECE OF MATERIAL
TO BE WORKED UPON TO A TOOL
Filed May 10, 1951  4 Sheets-Sheet 1
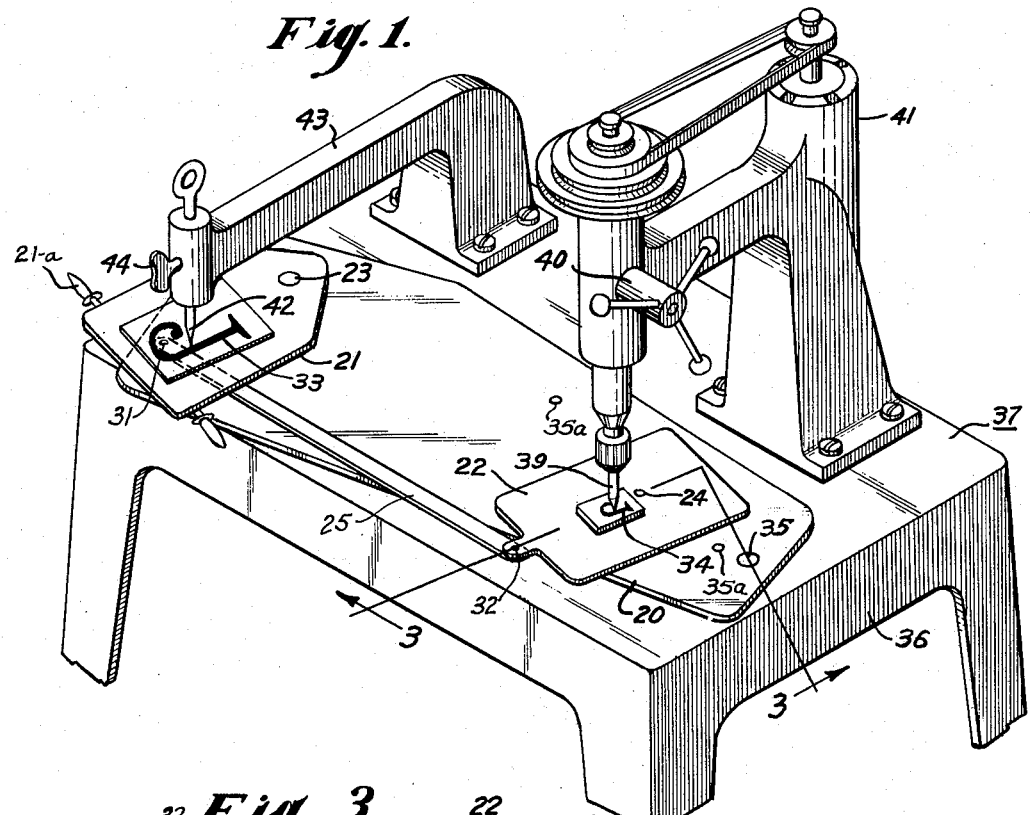
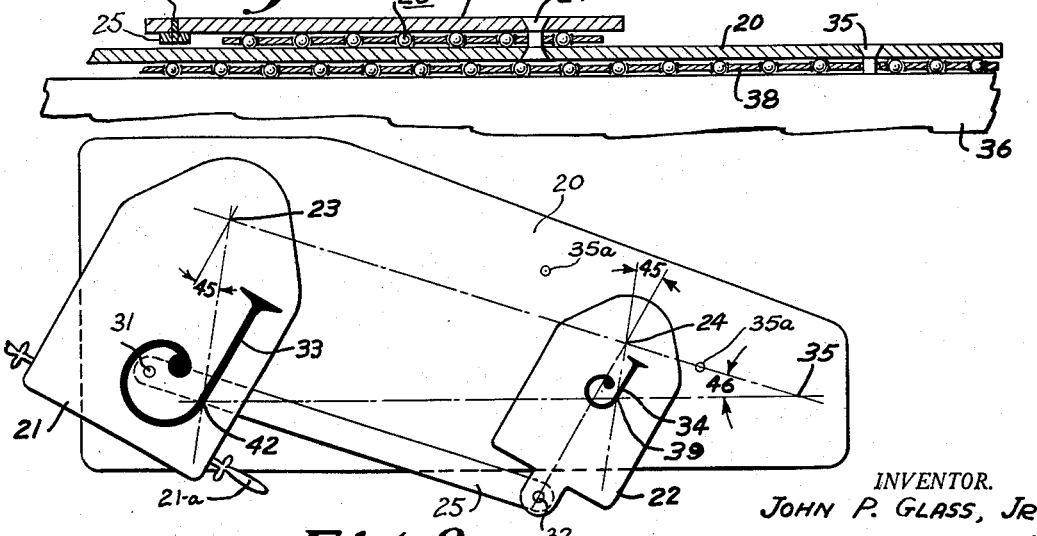
INVENTOR.
JOHN P. GLASS, JR.
BY Leonard L. Kaliah
ATTORNEY.

Sept. 27, 1955  J. P. GLASS, JR  2,718,702
MECHANISM FOR SIMULTANEOUSLY PRESENTING A PATTERN
TO A TRACER AND A PIECE OF MATERIAL
TO BE WORKED UPON TO A TOOL
Filed May 10, 1951  4 Sheets-Sheet 2
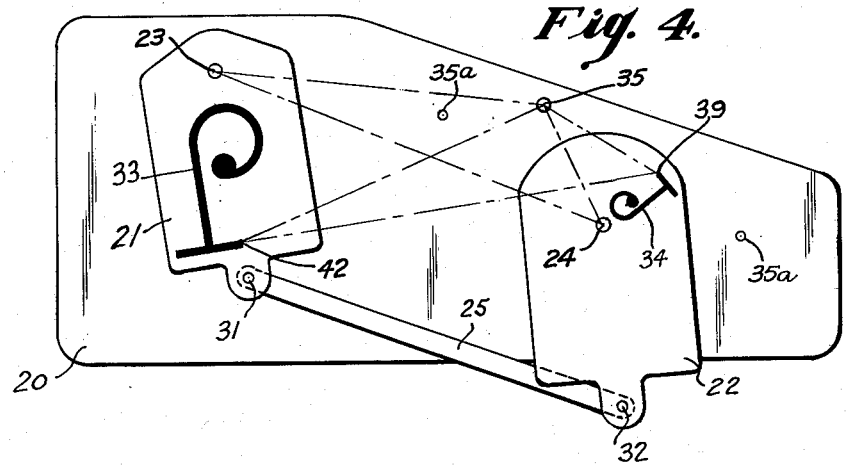
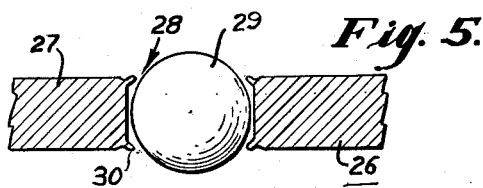
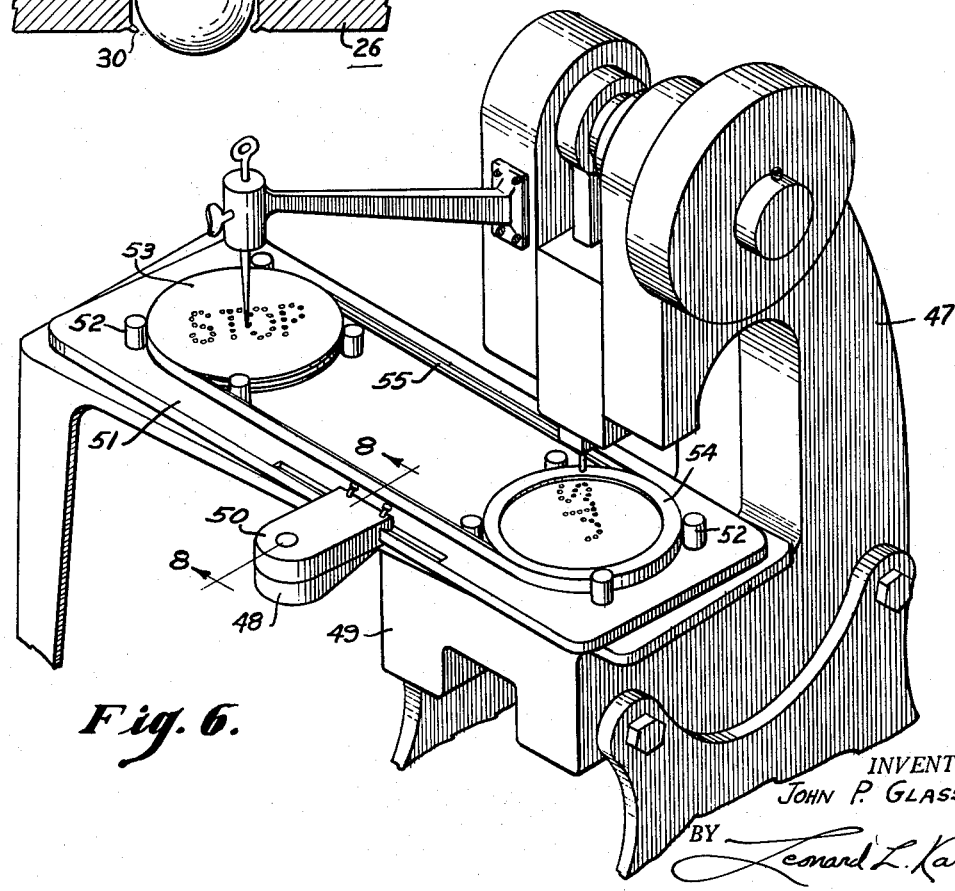
INVENTOR.
JOHN P. GLASS, JR.
BY Leonard L. Kalish
ATTORNEY.

INVENTOR.
JOHN P. GLASS, JR
BY Leonard L. Kalish
ATTORNEY.

Sept. 27, 1955    J. P. GLASS, JR    2,718,702
MECHANISM FOR SIMULTANEOUSLY PRESENTING A PATTERN
TO A TRACER AND A PIECE OF MATERIAL
TO BE WORKED UPON TO A TOOL
Filed May 10, 1951    4 Sheets-Sheet 4

INVENTOR.
JOHN P. GLASS, JR.
BY Leonard L. Kalish

ATTORNEY

_United States Patent Office_

2,718,702
Patented Sept. 27, 1955

2,718,702

MECHANISM FOR SIMULTANEOUSLY PRESENTING A PATTERN TO A TRACER AND A PIECE OF MATERIAL TO BE WORKED UPON TO A TOOL

John P. Glass, Jr., Haverford Township,
Delaware County, Pa.

Application May 10, 1951, Serial No. 225,516

7 Claims.  (Cl. 33—25)

The present invention relates to reproducing devices or copying devices and particularly to pantographs or the like.

An object of the present invention is to provide a pantograph for use with a heavy-duty metal-working or wood-working machine such as a milling machine or the like.

Another object of the present invention is to provide a pantograph or copying device wherein the pattern and the work are movable, whereas the tracing-point and duplicating-member are stationary.

Another object of the present invention is to provide a duplicating-means for enlarging, reducing, inverting or reversing a reproduction in proportion to a pattern, master, template, image or the like.

Another object of the present invention is to provide a pantograph or similar reproducing device wherein the ratio of reproduction is the ratio of (a) the distance the center of rotation of a rotatable pattern-supporting member moves relative to a tracing-point to (b) the distance the center of rotation of a rotatable work-supporting member moves relative to a duplicating member.

Another object of the present invention is to provide sturdy, rigid, movable pattern-supporting and work-supporting surfaces for use with a machine such as a milling machine or the like wherein the raw-material may be movably supported beneath the duplicating-member to reproduce the pattern without moving the machine or the duplicating-member thereof.

Another object of the present invention is to provide a reproducing machine such as a pantograph or the like wherein a plurality of reproductions may be duplicated simultaneously.

Another object is to provide a polar-type pantograph wherein the angular magnitude of the rotary movement of a work-supporting table is equal to the angular magnitude of the rotary movement of a pattern-supporting table, and wherein the distance the center of rotation of the work-supporting table moves radially from a duplicating-member, relative to the distance the center of rotation of the pattern-supporting table moves radially from a tracing-point, may be predetermined and is equal to the ratio of reproduction of the pantograph.

Further objects will be apparent by reference to the appended specification, drawings and claims.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

Figure 1 represents a perspective view of one embodiment of the reproducing machine of the present invention.

Figure 2 represents a diagrammatic top plan view of the embodiment of the reproducing device of the present invention illustrated in Figure 1.

Figure 3 represents a vertical cross-sectional view taken generally along lines 3—3 of Figure 1.

Figure 4 represents a diagrammatic top plan view, similar to Figure 2, showing the pivot-point of the ratio-member operatively disposed generally intermediate the pattern-supporting table and the work-supporting table.

Figure 5 represents an enlarged fragmentary vertical cross-sectional view of the anti-friction member of the present invention.

Figure 6 represents a perspective view of another embodiment of the present invention, used in cooperation with a punch-press or the like.

Figure 9:
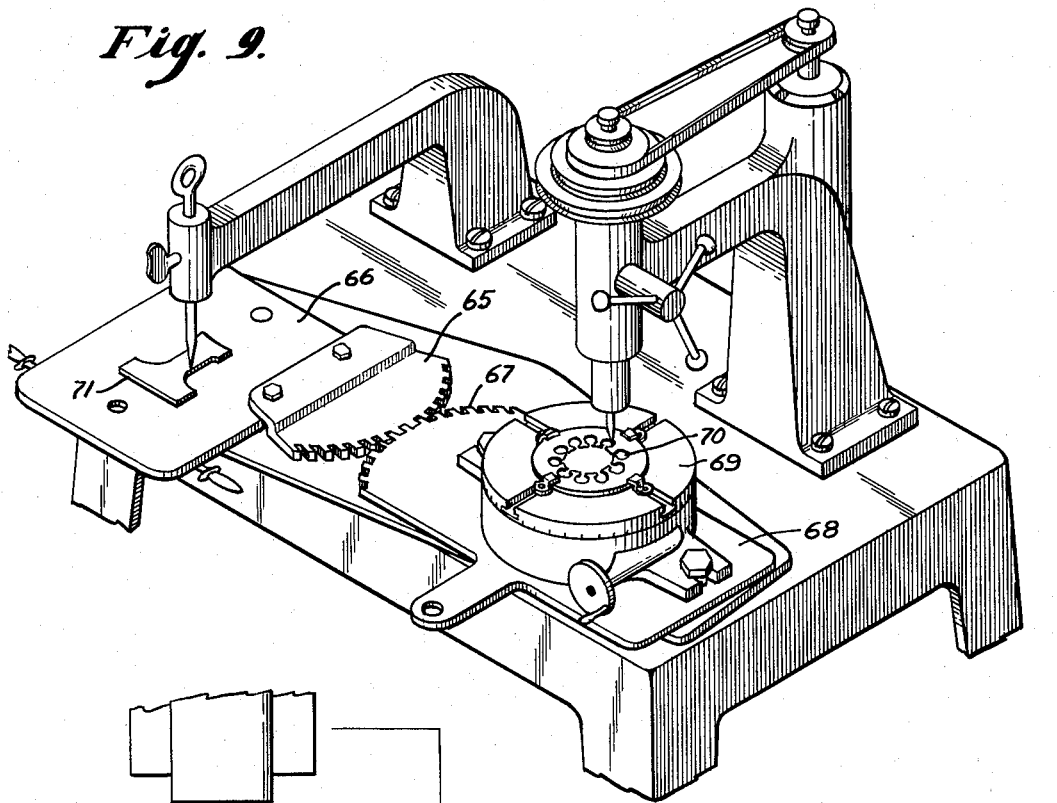
Figure 9 represents a perspective view of still another embodiment of the present invention.

The present invention provides a means for duplicating, enlarging, reducing, reversing or inverting at a 1:1 ratio or at any other ratio (within the limits of the mechanism) from a model, pattern, master, template, image, or the like, without the necessity of moving the tracer-point or the duplicating-member by permitting the movement of the pattern and the movement of the work beneath the tracer-point and the duplicating-member, respectively.

The present invention provides a movable pattern-supporting table and a movable work-supporting table; the movement of the two tables relative to the tracing-point and the duplicating-member or to each other being controlled by interconnection between the two tables.

The ratio of reproduction is determined by the proportionate distance the center of rotation of the work-supporting table moves from the duplicating-member relative to the distance the center of rotation of the pattern-supporting table moves from the tracing-point. In one embodiment of the present invention, the ratio of reproduction is controlled merely by changing the position of the pivot for the ratio-member (which supports the work-supporting table and the pattern-supporting table) relative to the tracing-point and the duplicating-member. In another embodiment, the ratio of reproduction is controlled by a gear-train, or the like, which shifts the centers of rotation of the tables proportionately from their respective tracing-point or duplicating-member.

As illustrated in Figures 1 to 5 inclusive, one embodiment of the present invention consists of a portable ratio-member 20 which has connected thereto a rotatable pattern-supporting table 21 and a rotatable work-supporting table 22. The tables 21 and 22 are rotatably connected to the ratio-member 20 by the pivots 23 and 24, respectively. The tables 21 and 22 are interconnected, as by the link 25 (which is disposed parallel to a line passing between the pivots 23 and 24) so that the angular movement of the table 21 about the pivot 23 will, at all times, be exactly of the same angular magnitude as the angular movement of the table 22 about the pivot 24.

Each of the tables 21 and 22 is supported on the ratio-member 20 so as freely to move with respect to the ratio-member 20 about the pivots 23 and 24 without any looseness or "play" therebetween. To this end, as is illustrated in Figure 3, the tables, such as the plate 22, may be bearinged in the ratio-member 20 by the pivot 24 which may be an anti-friction bearing adapted for thrust and radial loads, or any other type of bearing which "pre-loads" the tables 21 and/or 22 with respect to the ratio-member 20 to eliminate looseness or "play."

A plurality of anti-friction members 26 may be interposed between the tables 21 and 22 and the ratio-member 20 to provide a rigid support in a vertical direction while yet permitting free relative rotational movement therebetween in parallel planes.

As is shown in the enlarged view of Figure 5, the anti-friction member 26 may consist of a plate 27 having a plurality of holes 28 therein, in each of which a ball-member 29 is disposed. A plurality of flanges or retaining lugs 30 may be staked or otherwise formed in the plate 27, around each of the holes 28, to retain a ball therein while yet permitting the ball to rotate freely.

The connecting link 25 is pivotally supported at one end to the table 21, as at 31, and at the other end to the table 22, as at 32, and the pivotal supports 31 and 32 are the same distance apart as are the pivots 23 and 24.

The table 21 is adapted to support a pattern 33 thereon, whereas the table 22 is adapted to support the raw-material or work 34 (upon which work the configurations of the pattern 33 will be reproduced).

In the embodiment shown in Figure 1, the ratio-member 20 is pivoted, at pivot 35, so that the work 34 will be reproduced at a smaller size than the pattern 33. The ratio-member 20 is rotatably supported by the pivot 35 to the base-member or body-member such as the base 36 of the machine 37. The ratio-member 20 is supported on the base 36 by pre-loading the pivot 35 against the anti-friction member 38 interposed therebetween.

The pattern-supporting table 21 may have a plurality of hand-grips 21—a operatively secured thereto whereby to rotate the tables 21 and 22 relative to the pivots 23 and 24, respectively, and also to rotate the tables 21 and 22 and the ratio-member 20 relative to the pivot 35. Pivot 35 may be moved about ratio-member 20 such as by insertion in any one of a plurality of pivot holes designated 35a.

The machine 37 may be a metal-working machine such as a milling machine, punch-press, nibbling machine, etc., or any other machine, the details of which do not form a part of this invention. The duplicating-member 39 is generally fixed in a plane parallel to the base 36, with a control-handle 40 or the like whereby it may, selectively, be raised or lowered with respect to the work 34. As is illustrated in Figure 1, the duplicating-member 39 may be rotated by the motor 41 after or while being brought into operative juxtaposition with the work 34 by the handle 40.

A tracing-point 42 is secured to the base 36, as by the arm 43; releasable means such as the thumb-screw 44 being provided adjustably to secure the tracer 42 perpendicularly to the pattern 33.

Although the vertical positions of the tracing-point 42 and the duplicating-member 39 may be adjusted, the center-to-center distance therebetween is fixed and is the same as the center-to-center distance between the pivots 23 and 24.

The relative positions of the pivot 35, centers 23 and 24 (of the tables 21 and 22), tracing-point 42 and duplicating-member 39 are as follows: The triangle defined by the pivot 35 and the centers 23 and 24 is always identical to the triangle defined by the pivot 35, the tracing-point 42 and the duplicating-member 39. Of course, the three points in each of the geometrical figures above described may lie in a straight line, as is particularly illustrated in Figure 2, depending on the position of the pivot 35. The pivot 35 may be moved to give the desired reproduction ratio and to give the desired relative disposition between the pattern 33 and the work 34, as is particularly illustrated in Figure 4.

Regardless of the position of the pivot 35 and the relative angular position of the tables 21 and 22 with respect to the ratio-member 20, the triangle 35—23—24 is identical to the triangle 35—42—39; the side 23—35 being equal to the side 42—35, the side 24—35 being equal to the side 39—35, and the sides 23—24 and 42—39 being equal.

Thus, the ratio of reproduction is proportionate to the ratio of the length of side 23—35 to the length of side 24—35 (and to the ratio of the side 42—35 to the side 39—35), and also is proportionate to the ratio of the distance the point 23 moves from the point 42 as compared to the simultaneous movement of the point 24 relative to the point 39.

The reproducing mechanism of the present invention may be described with respect to polar coordinates rather than rectangular coordinates; the angular magnitude of the movement of the center of rotation of the pattern-supporting table being equal to the angular magnitude of the movement of the center of rotation of the work-supporting table, with the radial movement of the center of rotation of the pattern-supporting table relative to the tracing-point being proportionate to the movement of the center of rotation of the work-supporting table relative to the duplicating-member.

As is illustrated particularly in Figure 2, the movement of the work 34 on the table 22 bears a direct relation to the movement of the pattern 33 on the table 21. The relation is a function of the movement of the tables 21 and 22 through the angle 45, about the pivots 23 and 24 (the magnitude of the angular movement of the table 21 about the pivot 23 being the same as the magnitude of the angular movement of the table 22 about the pivot 24) and through the angle 46 about the pivot 35.

Although the pivot 35 may, selectively, be placed anywhere desired on the ratio-member 20 to secure the desired ratio of reproduction and position of the image (i. e., inverted or reversed), the ratio-member 20 must be rotatably positioned upon the base 36 so that the centers of rotation of the tables 21 and 22 would be positioned beneath the tracing-point 42 and duplicating-member 39, respectively, if the ratio-member were rotated to superimpose the identical triangles 35—23—24 and 35—42—39.

If the tables 21 and 22 are interconnected (as, for instance, by the link 25) so that they rotate in the same direction, the pattern and the reproduction will both face the same way. That is, if the pattern is "right-hand," the reproduction will be "right-hand." If the tables 21 and 22 are interconnected so as to rotate in opposite directions, as is illustrated in Figure 9, the pattern and the work will face in opposite directions (if the pattern is "right-hand," the work will be "left-hand").

Figure 10:
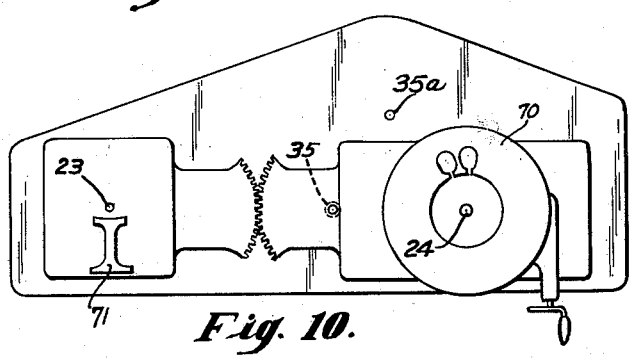
Figure 10 represents a diagrammatic top plan view of the embodiment of the present invention shown in Figure 9.

The position of the work on the work-supporting table relative to a line drawn between the duplicating-member 39 and the pivot 35 is always the same as the position of the pattern 33 relative to a line drawn between the tracing-point 42 and the pivot 35. Thus, if the pivot 35 is placed to the right of the work-supporting table 22, as is shown in Figure 2, both the pattern and the reproduction will be right-side-up. If the pivot 35 is placed on a center-line between the tracing-point 42 and the duplicating-member 39, the reproduction 34 will be inverted (Figure 10). If the pivot 35 is placed anywhere else on the ratio-member 20, as for instance in the position shown in Figure 4, the angle between the reproduction and a line drawn from the duplicating-member 39 to the pivot 35 will be the same as the angle between the pattern 33 and a line drawn from the tracing-point 42 to the pivot 35.

With the present invention, the size of the reproduction is controlled merely by moving a single member—the pivot 35—about the ratio-member 20. The ratio-member 20 may have a plurality of pivot or bearing-holes formed therein, and the desired ratio may be selected merely by moving the pivot 35 to the pre-positioned bearing-hole which will give the desired ratio. The position of the pivot 35 will also determine the relative position of the reproduction with respect to the pattern.

Although the link 25 is illustrated as one means of rotating the tables 21 and 22 in the same direction, it is to be understood that any appropriate means such as gears, chain-drive, belt-drive or the like may be adapted to rotate the tables in the same direction. In Figure 6 there is illustrated a belt 55 for rotating the tables in the same direction. If the interconnecting belt shown in Figure 6 were crossed, the tables would rotate in opposite directions. In Figure 9 there is shown a pair of intermeshing gears or similarly toothed members interconnecting the pattern-supporting table and the work-supporting table whereby to rotate the said tables in opposite directions. If an idler gear were interposed between the intermeshed gears down in Figure 9, the work-supporting table and the pattern-supporting table would rotate in the same direction.

Figures 7, 8:
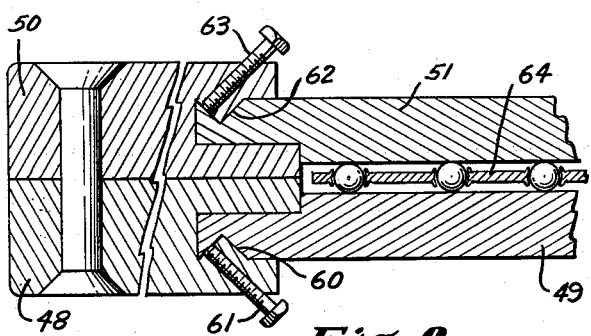
Figure 7 represents a fragmentary front elevational view of the work-supporting portion of the embodiment of the present invention shown in Figure 6.
Figure 8 represents an enlarged fragmentary vertical cross-sectional view of the adjustable pivot-member of the embodiment of the present invention shown in Figure 6.

In Figures 6, 7 and 8 there is shown another embodiment of the present invention adapted for use on a punch-press 47 or the like, with one portion 48 of an adjustable pivot operatively secured to the base 49 of the machine, and the complementary portion 50 of the pivot operatively and adjustably secured to the ratio-member 51. A plurality of bearings 52 rotatably secure the pattern-supporting table 53 to the ratio-member 51, and similar bearings 52 operatively secure the work-supporting table 54 rotatably upon the ratio-plate 51. The belt 55 interconnects the table 53 and the table 54 so that they rotate in the same direction and through angles of equal magnitude. Both the work-supporting table 54 and the ratio-member 51 are perforated, as at 56, to permit one member 57 of a punch-and-die set to be interposed beneath the work 58 (supported on the table 54) in operative juxtaposition to the other member 59 of the punch-and-die set.

The pivot-member 48 may be adjustably guided in the groove 60 of the base 49, and releasably secured thereto by the locking screw 61. Similarly, the pivot-member 50 may be adjustably secured to the ratio-member 51 in the groove 62 by the locking screw 63. An anti-friction bearing-plate 64 may be interposed between the base 49 and the ratio-member 51, as is shown particularly in Figure 8.

The embodiment illustrated in Figure 9 is similar to the embodiments shown in Figures 1 to 5, and 6 to 8. However, in the embodiment shown in Figure 9, an arcuate toothed segment 65 is secured to the pattern-supporting table 66 and adapted operatively to engage the toothed arcuate edge 67 of the work-supporting table 68. In this manner, the work-supporting table 68 will rotate in a direction opposite to the direction of rotation of the pattern-supporting table 66.

In the embodiment shown in Figure 9, a separate work-supporting surface 69 is secured to the table 68 so that the work 70 secured to the surface 69 may be rotated independently of and with respect to the table 68. In this fashion, a pattern 71 (such as the enlarged model of a gear-tooth or stator-tooth or the like) may be reproduced in the work 70, at one position thereof, and then the work 70 may be rotated by the supporting surface 69, through any desired angle, and other teeth may be formed in the work 70 to produce the multi-toothed stator-lamination or the like illustrated in Figure 9.

The schematic illustration of Figure 10 shows the relative position of the pattern 71 and the work 70 during the operation described immediately hereinabove with respect to the embodiment shown in Figure 9.

Figure 11:
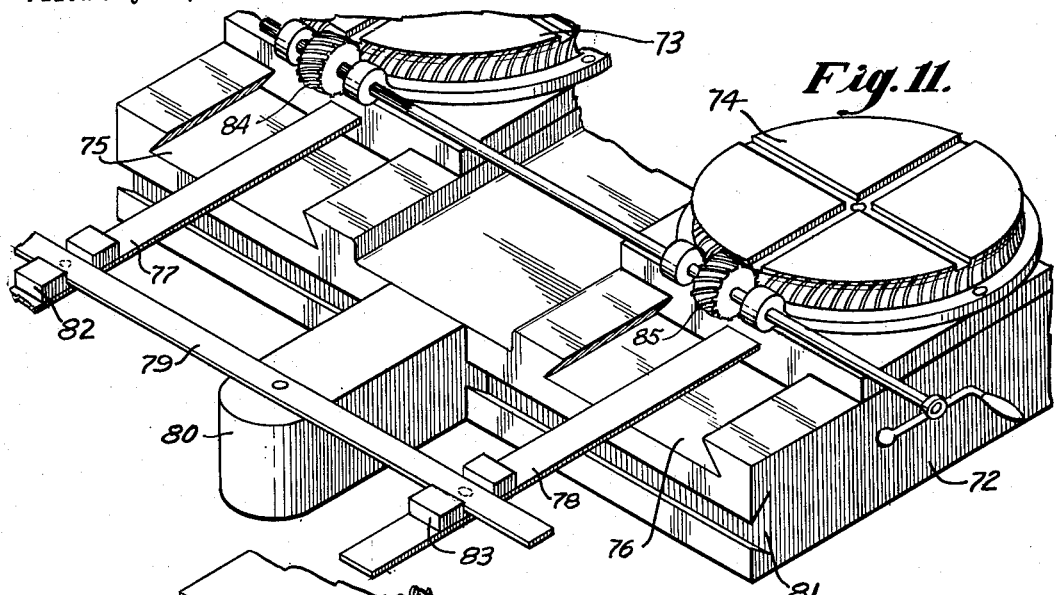
Figure 11 represents a fragmentary perspective view of another embodiment of the present invention, with a beam-type ratio-member or control-arm.

Still another embodiment of the present invention is illustrated in Figure 11 wherein the supporting surface 72 for the pattern-supporting table 73 and the work-supporting table 74 is immovable or fixed with respect to the position of the tracing-point and duplicating-member (not shown). The supporting surface 72 may be the bed or base of the machine such as the bed or the base 36 illustrated in Figure 1. Both the pattern-supporting table and the work-supporting table are supported and guided for relative movement in the guide-ways 75 and 76, respectively, and are interconnected through the extensions 77 and 78, respectively, by the pivot-member 79 which is rotatably supported intermediate the extensions 77 and 78 by the adjustable pivot-support 80. The pivot-support 80 may be adjustably supported in the guide-way 81 of the supporting surface 72.

In the embodiment illustrated in Figure 11, the work-supporting table and the pattern-supporting table may be moved relative to the juxtaposed duplicating-member and tracing-point, in a predetermined proportion, depending upon the position of the pivot-member 80 with respect to the slidable connections 82 and 83 of the extensions 77 and 78. If the distance from the pivot 80 to the connection 82 is equal to the distance from the pivot 80 to the connection 83, the relative movement of the tables 73 and 74 beneath the corresponding tracing-point and duplicating-member will be identical. If the pivot-member 80 is moved closer to the extension 78, the pattern-supporting table 73 will move a greater distance with respect to the juxtaposed tracing-point than will the work-supporting table 74 move with respect to its juxtaposed duplicating-member. In this manner, the image reproduced will be smaller than the model. Any relative size of pattern and reproduction can be secured by selecting the appropriate position of the pivot-member 80 with respect to the extensions 77 and 78.

In the embodiment shown in Figure 11, the pattern-supporting table 73 and the work-supporting table 74 have toothed or gear-like peripheries in engagement with the worms 84 and 85. The worms 84 and 85 may be interconnected by the shaft 86 (which has a splined connection with the worm 84) whereby the tables 73 and 74 may be rotated through angles of equal magnitude by turning the handle 87 attached to the shaft 86.

Figure 12:
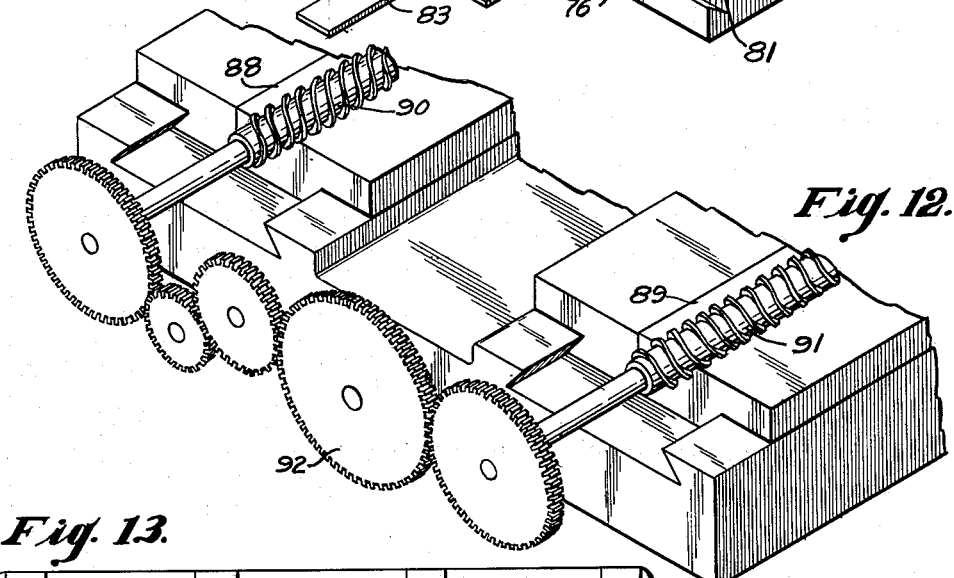
Figure 12 represents a fragmentary perspective view of an embodiment of the present invention, similar to the embodiment shown in Figure 11, wherein the ratio-control mechanism is a gear-train.

In Figure 12 there is illustrated an alternative method of moving the tables 73 and 74 relative to the tracing-point and the duplicating-member. In this embodiment, racks 88 and 89 may be secured to the supports for the tables 73 and 74 with a worm 90 in engagement with the rack 88 and a worm 91 in engagement with the rack 89. A gear-train 92 may interconnect the worms 90 and 91 to move the tables 73 and 74 in the guide-ways 75 and 76, respectively. Appropriate selection of gears will determine the relative movements of the tables from the corresponding tracing-point or duplicating-member, and thus control the ratio of reproduction.

Figure 13:
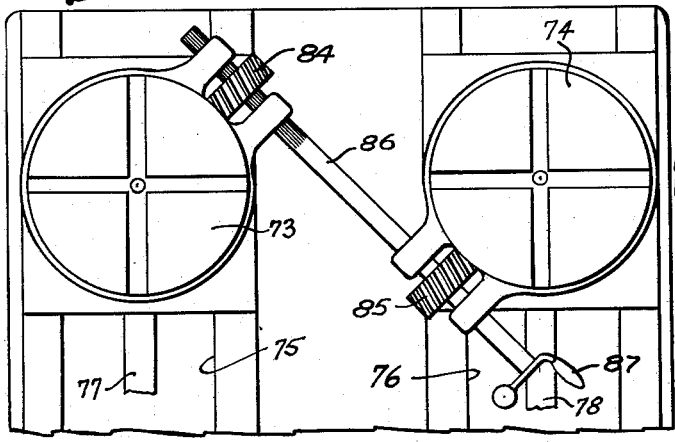
Figure 13 represents a top plan view of the embodiment of the present invention shown in Figure 11, with the angular control mechanism operatively connected to the pattern-supporting table and to the work-supporting table to rotate said tables in opposite directions.
Figure 14:
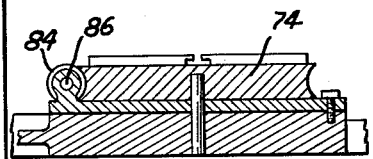
Figure 14 represents a vertical cross-sectional view taken generally along line 14—14 of Figure 11.

In Figure 13 there is illustrated the method of interconnecting the worms 84 and 85 with the shaft 86 so that the tables 73 and 74 will rotate in opposite directions.

It is to be understood that, although I have illustrated but a single work-supporting table and duplicating-member operatively associated therewith in combination with the pattern-supporting table and tracing-point, a plurality of work-supporting tables and juxtaposed duplicating-members may be used with a single pattern-supporting table and tracing-point. If all of the reproductions are to be identical in size and relative position, the position of each work-supporting table must be the same with respect to the position of the pivot of the ratio-member.

If the reproductions are to vary in size, with respect to each other, the position of the work-supporting tables and the duplicating-members operatively associated therewith must be changed accordingly.

Thus, it is possible, with the present invention, to provide a plurality of reproductions either identical in size and position or varying from each other in size and position.

In the present invention, the ratio of reproduction is determined by the distance the center of rotation of the work-supporting table moves relative to the duplicating-member as compared to the distance the center of rotation of the pattern-supporting table moves relative to the tracing-point. In the embodiments shown in Figures 1 to 10 inclusive, the movement is rotary about the pivot of the ratio-member. In the embodiments of Figures 11 to 14 inclusive, the movement is straight-line. In all instances, the rotary movement of the tables about their respective axes is of equal magnitude.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention what I claim as new and desire to protect by Letters Patent is the following:

1. A mechanism for simultaneously presenting a pattern to a tracer element and a workpiece to a tool, said mechanism comprising a base member having a horizontal upper surface, a ratio member having a horizontal surface superposed on said base surface, each of said members having a plurality of vertical pivot means, connecting means selectively engageable with any of said pivot means of the respective members to mount the ratio member for pivotal movement about a selected vertical pivot axis on the base member, spaced brackets fixed on said base member and overhanging said ratio member, a tracer element depending vertically from one of said brackets and a tool depending vertically from the other bracket, a pattern support pivoted on the ratio member below the tracer element and a workpiece support pivoted on the ratio member below the tool, and a connection between said pattern support and said workpiece support causing them to turn in unison at the same angular magnitude about their respective pivots on said ratio member whereby movement of the pattern support to bring the tracer element progressively into engagement with portions of a pattern fixed on said support will cause the workpiece support to move correspondingly to bring the tool progressively into engagement with portions of a workpiece fixed on the workpiece support at a ratio whose magnitude depends on the pivot axis at which the ratio member is connected to the base member.

2. Mechanism as claimed in claim 1, in which the pattern support and the workpiece support are flat tables and the connection between them is a link pivoted to each of said tables.

3. Mechanism as claimed in claim 1, in which the pattern support and the workpiece support are flat tables and the connection between them is a link connected to said tables at pivot points establishing a line parallel to a line passing through the axes of the pivots connecting the tables to the ratio member.

4. Mechanism as claimed in claim 1, in which the pattern support and the workpiece support are circular tables and the connection between them comprises endless means frictionally engaged with peripheral portions of said tables.

5. Mechanism as claimed in claim 1, in which the pattern support and the workpiece support are flat tables and the connection between them comprises interfitting portions of the adjacent edges of said tables.

6. Mechanism as claimed in claim 1, in which the pivot means of the members includes means cooperable with the selectively engageable connecting means for connecting the members at a pivot axis between the pivot axes of the pattern and workpiece supports on the ratio member.

7. Mechanism as claimed in claim 1, in which the pivot means of the members includes means cooperable with the selectively engageable connecting means for connecting the members at a pivot axis spaced from both supports, with one of said supports between said pivot axis and the other support.

References Cited in the file of this patent

UNITED STATES PATENTS

| | | |
|---|---|---|
| 873,008 | Bausch | Dec. 10, 1907 |
| 1,262,441 | Briggs | Apr. 9, 1918 |
| 1,714,984 | Nebel | May 28, 1929 |
| 1,795,887 | Quattrocchi | Mar. 10, 1931 |
| 2,171,211 | Day | Aug. 29, 1939 |
| 2,179,388 | Taylor | Nov. 7, 1939 |
| 2,445,971 | Rosen | July 27, 1948 |
| 2,497,013 | Raynes | Feb. 7, 1950 |
| 2,600,402 | Griffin | June 17, 1952 |